US012153459B2

(12) United States Patent
Xiao et al.

(10) Patent No.: US 12,153,459 B2
(45) Date of Patent: Nov. 26, 2024

(54) LOW OUTPUT IMPEDANCE DRIVER CIRCUITS AND SYSTEMS

(71) Applicant: TEXAS INSTRUMENTS INCORPORATED, Dallas, TX (US)

(72) Inventors: Boqiang Xiao, Tucson, AZ (US); Avinash Shreepathi Bhat, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 231 days.

(21) Appl. No.: 17/734,028

(22) Filed: Apr. 30, 2022

(65) Prior Publication Data

US 2023/0122789 A1 Apr. 20, 2023

Related U.S. Application Data

(60) Provisional application No. 63/257,040, filed on Oct. 18, 2021.

(51) Int. Cl.
*G05F 1/575* (2006.01)
*G05F 1/563* (2006.01)
*G05F 3/26* (2006.01)

(52) U.S. Cl.
CPC .............. *G05F 1/563* (2013.01); *G05F 1/575* (2013.01); *G05F 3/267* (2013.01)

(58) Field of Classification Search
CPC .......... G05F 1/462; G05F 1/465; G05F 1/468; G05F 1/56; G05F 1/575; G05F 1/562;
(Continued)

(56) References Cited

U.S. PATENT DOCUMENTS 5,087,834 A * 2/1992 Tsay .......................... G05F 3/24 327/539
8,169,203 B1 * 5/2012 Vemula .................. G05F 1/575 323/273

(Continued)

FOREIGN PATENT DOCUMENTS

KR 20200012434 A 2/2020

OTHER PUBLICATIONS

Texas Instruments—TPS7A10; TPS7A10 300-mA, Low V-In, Low V-Out, Ultra-Low Dropout Regulator, SBVS314B; Mar. 2018—Revised Oct. 2018; 40 pgs.

(Continued)

*Primary Examiner* — Thienvu V Tran
*Assistant Examiner* — Nusrat Quddus
(74) *Attorney, Agent, or Firm* — Charles F. Koch; Frank D. Cimino

(57) ABSTRACT

In an example, a circuit includes an input stage having a control voltage input, a feedback input, a first control output and a second control output. The feedback input is coupled to a driver output. A first path stage has a first voltage input and a third output. The first voltage input is coupled to the first control output, and the third output is coupled to the driver output. A second path stage has a second voltage input and a fourth output. The second voltage input is coupled to the second control output, and the fourth output is coupled to the driver output. A load transistor has a control input coupled to the driver output. The input stage is configured to provide gm-boosting to the first path stage to turn on the load transistor responsive to an output voltage at a voltage output.

23 Claims, 5 Drawing Sheets

(58) Field of Classification Search
CPC .......... G05F 1/565; G05F 1/567; G05F 1/569; G05F 1/571; G05F 1/573; G05F 1/5735
See application file for complete search history.

(56) References Cited

U.S. PATENT DOCUMENTS

| | | | | |
|---|---|---|---|---|
| 9,134,743 | B2 * | 9/2015 | Bisson | G05F 1/575 |
| 9,753,476 | B1 * | 9/2017 | Shukla | G05F 1/562 |
| 9,755,519 | B1 * | 9/2017 | Huang | H03K 17/687 |
| 10,416,695 | B1 * | 9/2019 | Bohannon | H03F 3/45192 |
| 10,747,251 | B2 * | 8/2020 | Dooghabadi | G05F 1/565 |
| 11,038,502 | B1 * | 6/2021 | Xie | H02M 1/08 |
| 11,507,120 | B2 * | 11/2022 | Shreepathi Bhat | G05F 1/575 |
| 2005/0253645 | A1 * | 11/2005 | North | G05F 3/267 327/543 |
| 2006/0012411 | A1 * | 1/2006 | De Langen | H03F 1/30 327/170 |
| 2006/0197513 | A1 * | 9/2006 | Tang | H03F 3/345 323/273 |
| 2007/0007934 | A1 * | 1/2007 | Imtiaz | G05F 3/267 323/274 |
| 2011/0291707 | A1 * | 12/2011 | Illegems | H03K 17/0822 327/108 |
| 2014/0306679 | A1 * | 10/2014 | Tseng | H02M 3/156 323/285 |
| 2015/0362935 | A1 * | 12/2015 | Patel | G05F 1/563 323/280 |
| 2016/0043539 | A1 * | 2/2016 | Mallala | G05F 1/573 361/18 |
| 2016/0079942 | A1 * | 3/2016 | Li | H04L 25/0272 330/261 |
| 2016/0187902 | A1 * | 6/2016 | Zeng | G05F 1/575 323/280 |
| 2017/0199537 | A1 * | 7/2017 | Duong | G05F 1/575 |
| 2020/0275041 | A1 | 8/2020 | Masahiro | |
| 2022/0171417 | A1 * | 6/2022 | Fiocchi | G05F 1/575 |
| 2022/0368324 | A1 * | 11/2022 | Stockstad | H02M 1/0006 |
| 2023/0088617 | A1 * | 3/2023 | Hashimoto | G05F 1/561 323/280 |
| 2023/0299675 | A1 * | 9/2023 | Xu | H02M 3/1566 323/271 |
| 2024/0053781 | A1 * | 2/2024 | Fiocchi | G05F 1/575 |
| 2024/0146306 | A1 * | 5/2024 | Ramkaj | H03K 19/018521 |

OTHER PUBLICATIONS

Texas Instruments; TPS7A11 500-mA, Low V-In, Low V-Out, Ultra-Low Dropout Regulator; TPS7A11; SBVS316B—Sep. 2018—Revised Dec. 2020; 40 pgs.
Texas Instruments, TPS7A88 Dual, 1-A, Low-Noise (3.8-μVRMS), LDO Voltage Regulator; TPS7A88; SBVS248A—Nov. 2015—Revised Nov. 2015; 38 pgs.
M. Luders, et al.; “Fully-integrated LDO voltage regulator for digital circuits”; Advances in Radio Science; Aug. 2011; 6 pgs.
Hua Chen and Ka Nang Leung; “A Fast-Transient LDO Based on Buffered Flipped Voltage Follower”; 2010 IEEE International Conference of Electron Devices and Solid-State Circuits (EDSSC); May 12, 2022; 4 pgs.
Francesco Centurelli, et al.; “A Class-AB Flipped Voltage Follower Output Stage”; 2011 20th European Conference on Circuit Theory and Design (ECCTD); May 12, 2022; 4 pgs.
Chutham Sawigun and Jirayuth Mahattanakul; “A Novel Structure of Wide-Swing CMOS Voltage Buffer”; ECTI-CON 2007 The 2007 ECTI International Conference; 4 pgs.
International PCT Search Report dated Feb. 14, 2023.
Machine translation, KR20200012434.

* cited by examiner

LOW OUTPUT IMPEDANCE DRIVER CIRCUITS AND SYSTEMS

CROSS-REFERENCE TO RELATED APPLICATION

This application claims priority to U.S. provisional patent application no. 63/257,040, filed on Oct. 18, 2021, which is incorporated herein by reference in its entirety.

TECHNICAL FIELD

This description relates to driver circuitry and systems using the driver circuitry.

BACKGROUND

Low-dropout (LDO) voltage regulators supply electrical power in a variety of applications, as for example in low-voltage devices such as voltage-controlled oscillators (VCOs), analog-to-digital converters, digital-to-analog converters (DACs), high-end processors, radio frequency (RF) amplifiers, serializer-deserializer (SerDes) circuits, field programmable gate arrays (FPGAs) and the like. The power management circuitry, which is configured to drive the LDO, can affect performance of the LDO. For example, the speed and headroom of the power management circuitry can impact the overall LDO performance.

SUMMARY

In a described example, a circuit includes an input stage, first and second path stages and a load transistor. The input stage has a control voltage input, a feedback input, a first control output and a second control output. The feedback input is coupled to a driver output. The first path stage has a first voltage input and a third output. The first voltage input is coupled to the first control output, and the third output is coupled to the driver output. The second path stage has a second voltage input and a fourth output. The second voltage input is coupled to the second control output, and the fourth output is coupled to the driver output. The load transistor has a control input and a voltage output. The control input is coupled to the driver output, and the input stage configured to apply gm-boosting to the first path stage to turn on the load transistor responsive to an output voltage at the voltage output.

In another described example, a circuit includes a common path input stage configured to provide a first gm-boosted control signal at a first output responsive to an error signal requesting turn on of a load transistor. The common path input stage is configured to provide a second control signal at a second output responsive to the error signal requesting turn off of the load transistor. A first path stage is configured to provide a first voltage to a driver output responsive to the first gm-boosted control signal. A second path stage is configured to provide a second voltage to the driver output responsive to the second control signal. The load transistor is configured to regulate the output voltage responsive to the voltage at the driver output by turning on responsive to the first voltage and turning off responsive to the second voltage.

In a further described example, a system includes an outer loop circuit, a class AB driver and a load. The outer loop circuit has a reference input, a feedback voltage input and an error output. The class AB driver includes a common path stage, a pull-up path circuit, and a pull-down path circuit. The common path stage has an error input, a feedback input, a first gm-boosted output and a second output. The error input is coupled to the error output. The pull-up path circuit includes a first buffer and a pull-up transistor. The first buffer has a first buffer input and a first buffer output, in which the first buffer input is coupled to the first gm-boosted output. The pull-up transistor has a first control input and a third output. The first control input is coupled to the first buffer output, and the third output is coupled to a driver output. The pull-down path circuit includes a second buffer and a pull-down transistor. The second buffer has a second voltage input and a second buffer output, in which the second voltage input is coupled to the second output. The pull-down transistor has a second control input and a fourth output. The second control input is coupled to the second buffer output, and the fourth output is coupled to the driver output. The load has an input and a feedback output, in which the input is coupled to the driver output and the feedback output is coupled to the feedback voltage input. The feedback output is configured to provide a signal representative of an output voltage.

DETAILED DESCRIPTION

Figure 1:
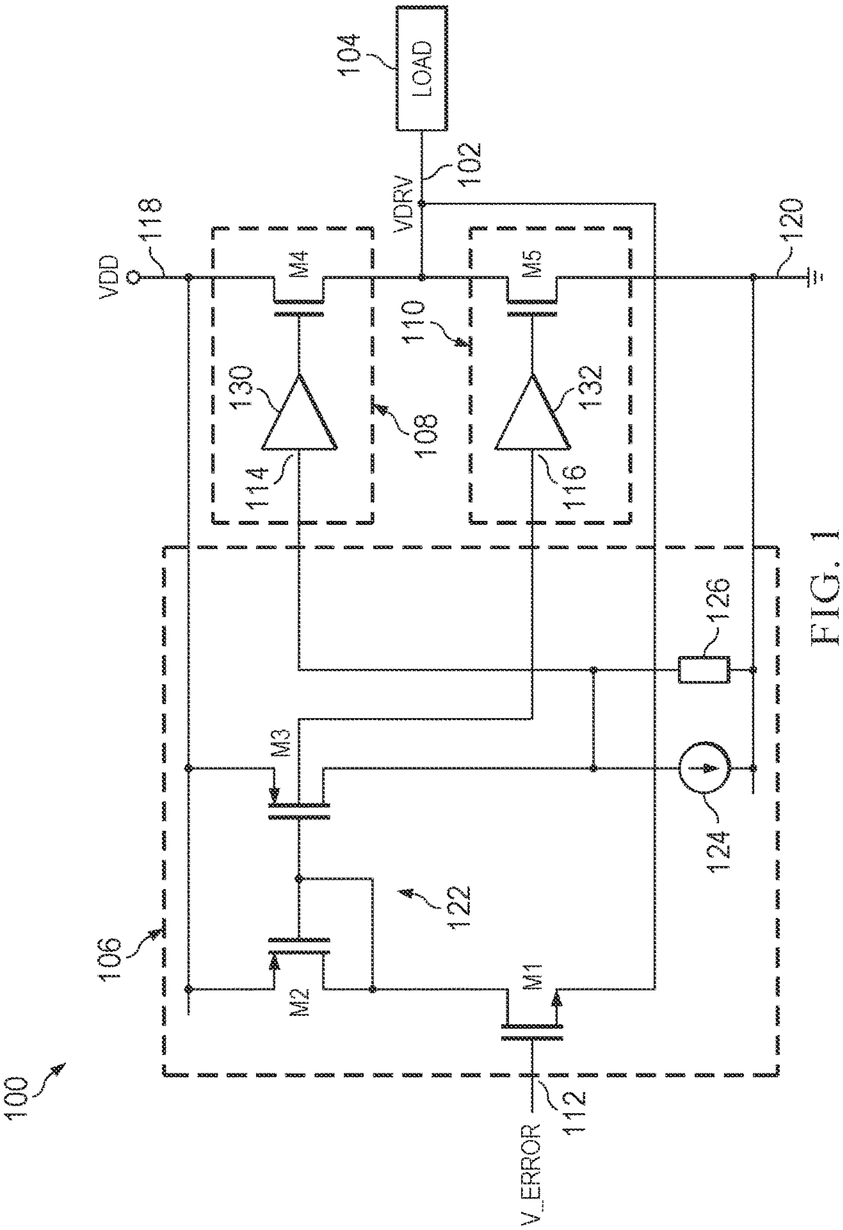
FIG. 1 illustrates an example driver circuit coupled to a load.

Example embodiments relate to driver circuitry, such as class AB driver circuits and to systems and circuits implementing one or more class AB driver circuits.

As an example, a driver circuit includes a common path input stage and first and second output stages coupled in parallel between first and second voltage terminals. Each of the first and second output stages can be implemented as including a respective buffer and output transistor. The output transistors can be coupled between the first and second voltage terminals, in which each output transistor is coupled to a driver output. The common path input stage has first and second outputs, in which the first output is coupled to an input of the respective buffer of the first output stage and the second output is coupled to an input of the respective buffer of the second output stage. The common path input stage is configured to provide a transconductance (gm)-boosted control signal at the first output to control the respective output transistor of the first output stage responsive an error signal. The common path input stage is configured to provide a second control signal at a second output to control the respective output transistor of the second output stage responsive to the error signal. The common path input stage is configured to apply the gm boost to the same polarity as the common path input or load transistor being driven. For the example of n-channel metal oxide semiconductor (NMOS) inputs or loads, the common path input stage is configured to apply the gm boost to the pull up, or turn on, of the load NMOS. For the example of p-channel metal oxide semiconductor (PMOS) inputs or loads, the common path input stage is configured to apply the gm boost to the pull down, or turn on, of the load PMOS. In some examples, the common path circuit includes a compensation filter to reduce peaking in the closed loop response of the driver circuit.

The driver circuit described herein can be implemented as a closed loop class AB driver configured to supply a drive signal to a capacitive circuit, which is adapted to be coupled to the driver output. The capacitive circuit can include a field effect transistor (FET), such as an n-channel FET (NFET) or p-channel FET (PFET), a bipolar junction transistor (BJT), such as an NPN or PNP, and/or other device having an input capacitance. For example, the driver output is coupled to the gate of a low-threshold-voltage (Vth) low-dropout (LDO) power FET. The driver circuit is configured to use gm-boosting to turn on the power FET. The driver circuit can also be configured to drive the gate of the LDO power FET close to ground for full turn off in low-input low-output (LILO) operation, which enables the driver circuit to achieve low headroom. The driver circuit further can maintain a low output impedance at the driver output for a finite current budget in order to remain stable in a high bandwidth (e.g., greater than 1 MHz) LDO loop. The class AB driver circuits and systems described herein thus can be configured to implement a low headroom, high bandwidth driver circuit. The driver circuit can also achieve a reduced output impedance with less current to allow upstream power management implemented by the common path circuit to have a smaller area and use reduced current compared to many existing designs.

As used herein, the term "circuit" can include a collection of active and/or passive elements that perform a circuit function, such as an analog circuit or control circuit. Additionally or alternatively, for example, the term "circuit" can include an integrated circuit (IC) where all and/or some of the circuit elements are fabricated on a common substrate (e.g., semiconductor substrate, such as a die or chip). In an example, the driver circuit 100 is implemented in an integrated circuit (IC) chip or as part of a system on chip (SoC).

FIG. 1 shows an example class AB driver circuit 100 having a driver output 102. For example, the driver output 102 is a terminal adapted to be coupled to output circuitry 104. In an example, the output circuitry 104 includes a capacitive load, such as including a transistor (e.g., FET, BJT, or the like), a capacitor or a load device having an input capacitance (e.g., more than 100 pF) when coupled at the driver output 102. The driver circuit 100 includes a common path input stage 106, a first output stage 108 and a second output stage 110. The common path input stage 106 has an input 112 and first and second outputs 114 and 116. The input 112 is adapted to receive an error signal V_ERROR, such as representative of a command for increasing or decreasing an output voltage provided to or otherwise used by the output circuitry 104. In the example of FIG. 1, the driver circuit 100 is coupled between first and second voltage terminals 118 and 120, shown as voltages VDD and ground. Other relative voltages can be used in other examples to establish a desired voltage potential between the terminals 118 and 120.

The input stage 106 includes an input transistor M1 having a gate coupled to (or providing) the common path input 112. In the example of FIG. 1, M1 is shown as a NFET. In another example, M1 could be implemented as a PFET or another type of transistor. The drain of M1 is coupled to a current mirror 122 and the source of M1 is coupled to the driver output 102, at which the driver circuit 100 provides a driver output signal VDRV. The current mirror 122 includes transistors M2 and M3, which are shown as p-channel FETs (PFETs). In another example, different types of transistors could be used to implement the current mirror 122, such as in a different driver configuration. M2 is diode-connected, in which the source is coupled to terminal 118 and the drain is coupled to the drain of M1. The source of M3 is coupled to terminal 118 and the drain is coupled to ground terminal 120 through a current source 124. The current source 124 is configured to provide a bias current to the drain of M3, such as can be fixed or dynamic bias current. A compensation filter network 126 is coupled in parallel with the current source 124. The drain of M3, which is coupled to the current source 124 and filter network 126, also is coupled to the first output 114 of the input stage 106. The filter network 126 is configured to stabilize the output 114.

The first output stage 108 includes a buffer 130 and an output transistor M4. An input of the buffer 130 is coupled to the first output 114, and the buffer output is coupled to the gate of M4. M4 is coupled between the voltage terminal 118 and the driver output 102. For example, the input of buffer 130 has a positive polarity. The input stage 106 is configured to supply a gm-boosted control signal at 114 responsive to the error signal V_ERROR having a value representative of a command to increase (or decrease) an output voltage. For example, the gain-boosting circuitry, which includes current source 124 and filter network 126, is coupled to the output of the current mirror (the drain of M3 and output 114). As described herein, the gain-boosting circuitry provides a gain described by the gm of M3 times an output impedance at 114 based on combined impedance at the drain of M3, current source 124 and filter network 126. The gain-boosting circuit thus is configured to implement gm-boosting for the first output stage 108. The input stage 106 thus is configured to provide the gm-boosted control signal to the input of output stage 108. In the example of FIG. 1, the buffer 130 is configured to pass the gm-boosted signal from 114 to the gate of M4, and M4 turns on to couple the driver output 102 to terminal 118 so the driver output 102 is pulled up. The gm-boosted control signal at 114 enables a stronger turn-on for M4 to provide improved responsiveness to increased power demands of the output circuitry 104, such as described herein.

The second output stage 110 includes a buffer 132 and an output transistor M5. An input of the buffer 132 is coupled to the second output 116, which is coupled to the common gates of M2 and M3. The output of the buffer 132 is coupled to the gate of M5, and M5 is coupled between the driver output 102 and the voltage terminal 120. For example, the input of buffer 132 has a negative polarity (e.g., opposite of the polarity at the input of buffer 130). The input stage 106 is configured to supply a respective control signal at a second output 116 responsive to the error signal V_ERROR requesting a decrease or no change in the output voltage. In the example of FIG. 1, the buffer 132 is configured to pass the second control signal to the gate of M5, which activates M5 to couple the driver output 102 to the terminal 120 and pull-down the driver output 102 to near ground as needed. The input stage 106 can be configured to provide the second control signal to the second output stage 110 without a gm-boost, as is provided to the first output stage 108. The gm-boosted control signal at 114 enables a stronger turn-on for M4 than for M5, and thus reduces undershoot at the output 102 responsive to increased voltage and/or current requirements of the output circuitry 104 responsive to signals at output 102.

In some examples, M5 can be implemented using a transistor that is of the same flavor of transistor as M4. As used herein, a given type of transistor (e.g., FET or BJT) has multiple subtypes, which are referred to herein as flavors (e.g., N or P flavors). For example, a FET transistor type (e.g., a MOSFET or junction FET (JFET)) can be implemented in n-channel FET (NFET) and PFET flavors. Similarly, a BJT type of transistor can be implemented in NPN and PNP flavors. A given driver circuit 100 can include more than one type of transistor, and different types of transistors can be the same or different flavors, such as described herein. For an example where the driver circuit 100 is implemented using FETs, M4 and M5 are both NFETs or M4 and M5 are both PFETs. In other examples, such as where M4 and M5 are implemented as bipolar junction transistors (BJTs), M4 and M5 are both NPN BJTs or M4 and M5 are both PNP BJTs.

In an example where the output circuitry 104 is implemented to include a load transistor (e.g., an LDO power transistor, such as M12 shown in FIGS. 2 and 3) having a control input coupled to the driver output 102, the LDO transistor can be implemented as the same flavor (e.g., N or P) of transistor as both M4 and M5. The LDO transistor, which is coupled at 102, can be the same or different type of transistor as M4 and M5, but implemented the same flavor (e.g., N or P). For example, M4 and M5 are NFETs and the LDO transistor is an NPN BJT (e.g., all N flavor transistors). In another example, M4 and M5 are PFETs and the LDO transistor is a PNP BJT (e.g., all P flavor transistors). Other types and flavors of transistors can also be used for M4, M5 and the LDO transistor. Using the same flavor of transistors for M4 and M5 in the push-pull buffer output stage of the class AB driver can improve performance for LILO operation. For example, using the same flavor of transistor helps improve headroom on M5 during pull down of the driver output 102, and can also help reduce output impedance (e.g., 1/gm) at 102 for increased pull up strength of M4

By configuring the input stage 106 to implement gm-boosting, as described herein, the output impedance at 102 can also be reduced for a given bias current. As a result, the driver circuit 100 can be implemented with low headroom and high bandwidth, particularly suitable for LILO operation and fast speed. This further enables upstream power management circuitry (e.g., charge pump circuitry—not shown) to be implemented with reduced area and configured to operate at lower current than many existing approaches.

Figure 2:
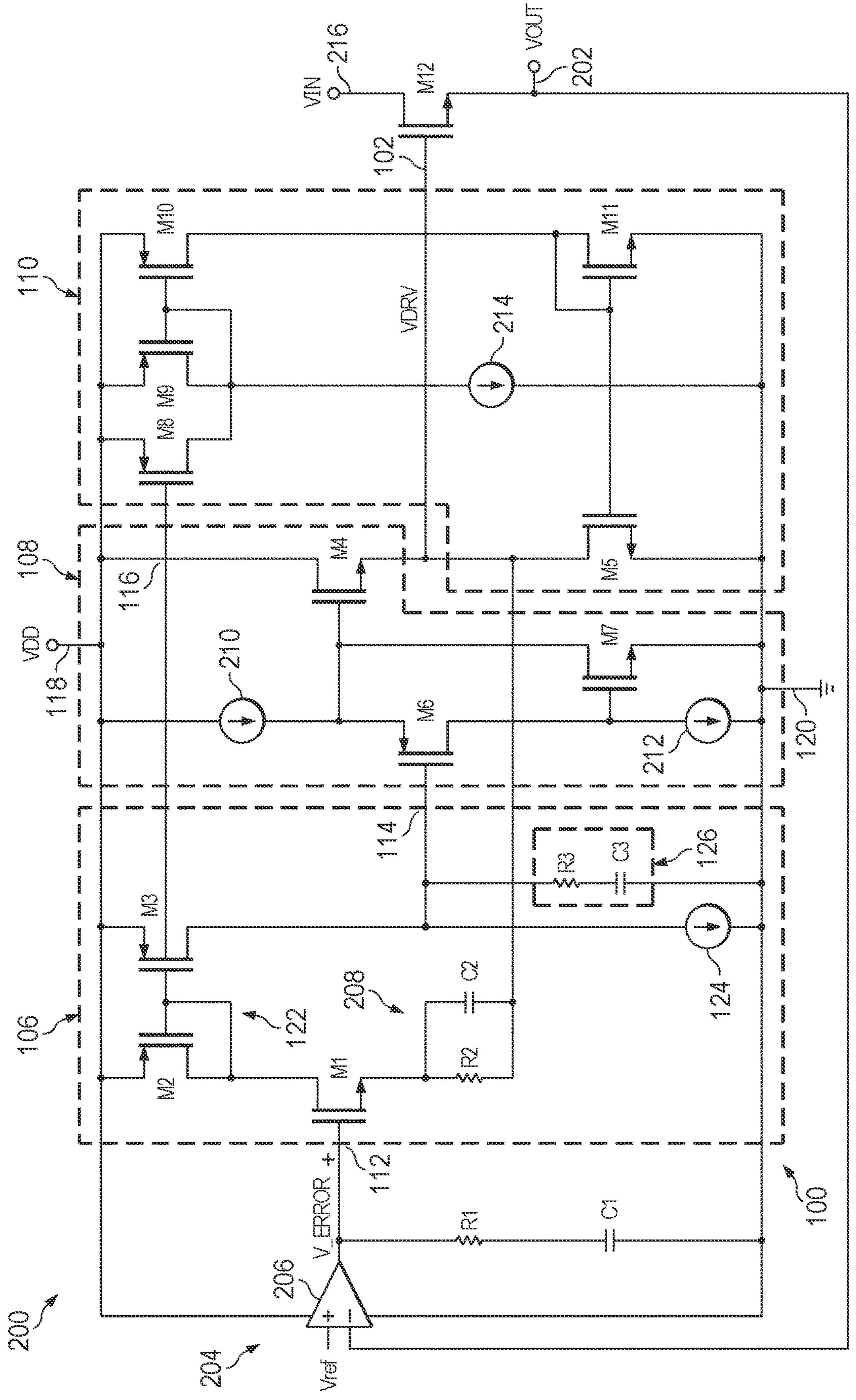
FIG. 2 illustrates an example voltage regulator including a driver circuit.

FIG. 2 shows an example voltage regulator system 200 configured to provide a regulated output voltage VOUT at an output 202. The regulator system 200 includes a driver circuit 100, such as can be used to implement the driver circuit 100 of FIG. 1. The description of FIG. 2 also refers to the FIG. 1. For example, the driver circuit 100 includes an input stage 106, a first output stage 108 and a second output stage 110, which are coupled between first and second voltage terminals 118 and 120, shown as VDD and ground. Also, the output circuit 104 includes load transistor M12 and output 202 and circuitry (if any) coupled to 202.

The regulator system 200 includes an outer loop circuit 204 configured to control the output voltage VOUT responsive to feedback. In the example of FIG. 2, the outer loop circuit 204 includes an error amplifier 206 having an inverting input coupled to the output 202. In another example, a divider circuit (e.g., a resistive divider) can be coupled between the output 202 and the inverting input of the error amplifier 206. A non-inverting input of the error amplifier 206 is configured to receive a reference voltage VREF. For example, the non-inverting input is coupled to an output of a reference voltage generator (e.g., a digital-to-analog converter or other DC source) configured to provide the reference voltage VREF. The error amplifier 206 has an output coupled to an input 112 of the input stage 106. A filter network, such as including a resistor R1 and capacitor C1, is coupled between the amplifier output and ground. The filter network is configured to help stabilize the error signal V_ERROR to the input 112 that is supplied to the input 112 of the driver circuit 100. The error amplifier 206 is configured to provide an error signal V_ERROR to the input responsive to VOUT and VREF. The error signal V_ERROR provides a voltage command representative of whether a higher or lower output voltage is to be produced at the output 202.

The input stage 106 includes an input transistor M1 having a gate coupled to the output of the amplifier 206. A filter 208 is coupled in an inner loop feedback path between the source of M1 and the driver output 102. For example, the filter 208 includes a parallel resistor R2 and a capacitor C2 configured to dampen peaking in the driver output signal VDRV provided at the output 102. The drain of M1 is coupled to a current mirror 122 formed of FETs M2 and M3. The gate and drain of M2 are coupled to the drain of M1. M2 and M3 have a common gate and a common source coupled to terminal 118. The drain of M3 is coupled to ground terminal 120 through current source 124. The current source 124 is configured to provide a bias current to the drain of M3, such as a fixed or dynamically biased current source. The current source 124 can be implemented as including an arrangement of current mirrors coupled to a main bias current generator (e.g., within an IC implementing the system 200). In the example of FIG. 2, the compensation filter network 126, which is coupled in parallel with the current source 124, includes a resistor R3 and a capacitor C3 coupled in series between the output 114 and terminal 120 (e.g., ground).

The first output stage 108 of the driver circuit 100 includes a PFET M6 coupled in series with respective current sources 210 and 212 between voltage terminals 118 and 120. The gate of M6 is coupled to the output 114 of the input stage 106. The source of M6 is coupled to the gate of NFET M4, and the source of M4 is coupled to the driver output 102. Another NFET M7 is coupled between the gate of M4 and the ground terminal 120. The gate of M7 is coupled to the drain of M6. Thus, in the example of FIG. 2, the input stage 106 is implemented as a gm-boosting buffer for the drive control path (e.g., shown as a turn-on path) configured to control M4 to pull up the drive output 102, which turns on load transistor M12, responsive to the error signal V_ERROR having a value representative of a command to increase the output voltage VOUT at 202.

The second output stage 110 of the driver circuit 100 includes a PFET M8 having a source coupled to voltage terminal 118 (e.g., VDD) and a drain coupled to the drain of M9 and to the gates of both M9 and M10. Like M8, the sources of M9 and M10 are coupled to voltage terminal 118. A current source 214 is coupled between the drain of M9 and voltage terminal 120 (e.g., ground). The current source 214 is configured to bias the current mirror network formed by M8, M9 and M10. The drain of M10 is coupled to the drain of NFET M11, which is diode-connected between M10 and voltage terminal 120 (e.g., ground). The gate and source of M11 are coupled to the gate of output FET M5. In the example of FIG. 2, the buffer, which is formed by M8, M9, M10, M11 and current source 214, is configured to turn on M5 and pull down the driver output 102 responsive to the control signal provided by input stage 106 at 116. As described above, the input stage 106 is configured to provide the control signal at 116 for activating the output FET M5 responsive to error signal V_ERROR commanding a reduction or no increase in VOUT.

The system 200 also includes a load FET M12 having a gate coupled to driver output 102. The source of M12 is coupled to the output terminal 202, and the drain of M12 is coupled an input voltage terminal 216 adapted to be coupled to an input voltage VIN. For example, M12 is implemented as an LDO power FET. As described herein, M12 can be implemented as an N or P flavor load transistor. In the example of FIGS. 2, M4, M5 and M12 are shown as being implemented as respective NFETs. In another example, M4, M5 and M12 are implemented as a PFET, in which VDD and VIN would become the same voltage supply.

Each of M4, M5 and M12 can be implemented using the same flavor of transistor, such as described herein. In the example of FIG. 2, each of M4, M5 and M12 are implemented using respective NFETs. In an alternative example, each of M4, M5 and M12 could be implemented using respective PFETs. In such alternative example, the flavor of the remaining FETs in the driver circuit would be changed (e.g., NFETs would become PFETs, and PFETs would become NFETs) and the relative voltages would be inverted from that shown and described. In yet another example, in which the transistors are implemented using BJTs, each of M4, M5 and M12 could be implemented using the same flavor of BJT, namely they could be NPN BJTs or they could be PNP BJTs. The respective transistors can also be mixed in type between FET and BJT, and implemented of the same flavor.

In an example, the regulator system 200, including the outer loop circuit 204, the driver circuit 100 and the output FET M12, is implemented in a single IC (e.g., on a given IC die). In another example, the output FET M12 is part of a separate IC external to an IC implementing the driver circuit 100 and the outer loop circuit 204.

In the example of FIG. 2, the driver circuit 100 is configured to gm-boost the turn-on path implemented by the output stage 108 responsive to the error signal V_ERROR having a value representative of VOUT<VREF. For example, the gain for the driver circuit 100 is represented as follows:

$$Gm = \frac{gm1}{gm2} * \left[\frac{gm8gm10gm5}{gm9gm11} + gm4gm3\left(RO3 \| R124 \| \left(R3 + \frac{1}{sC3}\right)\right)\right]$$

where:

$$\frac{gm1}{gm2}$$

is representative of the gain of the input stage 106 due to M1 and M2;

$$\frac{gm8gm10gm5}{gm9gm11}$$

is representative of the gain of the output stage 110 due to M8, M10, M5, M9 and M11; and $$gm4gm3\left(RO3 \| R124 \| \left(R3 + \frac{1}{sC3}\right)\right)$$

is representative of the gain of the output stage 108 due to M4 and M3 and the output impedance of M3 in parallel with the impedance of current source 124 in parallel with the filter network 126, which includes resistor R3 and capacitor C3. Thus, in practice the values of the components can be configured to tune the gm-boost is applied to input of the output stage 108 during pull-up of VDRV at the driver output 102 or when M12 is being turned on. For example, the current source 124 and the filter network 126 are configured to increase impedance at the gate of M6 (e.g., at the output 114) to implement the gm-boosting to the first path stage, as shown in the above equations. In a typical example, gm-boosting can increase transconductance gain (gm) by a factor of one hundred or more due to the increased impedance at the output 114 of the input stage 106 (e.g., due to $$gm3\left(RO3 \| R124 \| \left(R3 + \frac{1}{sC3}\right)\right)\Big).$$

The gm-boosting during turn on of M4 can thus push a pole of a capacitive power FET gate (or other capacitive load coupled to driver output 102) out of the LDO loop to a higher frequency while using a small amount of bias current. The second output stage 110 is configured to turn off the load transistor M12 to within a saturation voltage $V_{DSAT}$ of ground or a supply voltage (depending on the configuration of the driver circuit 100). For example, responsive to M5 being turned on to pull-down the driver output 102, the drive voltage VDRV swings to a saturation voltage of M5 (e.g., $V_{DSAT,M5}$) above the voltage (e.g., ground) at 120 while maintaining low wideband output impedance. Such features can be implemented in a low cost, low bias current circuit configuration (e.g., on an IC), which is useful for high bandwidth LDO operations.

In view of the foregoing, the voltage regulation system 200 includes a class AB driver circuit that provides desired voltage headroom and high bandwidth over a range of expected operating conditions. The driver circuit is particularly efficient and economical for LILO applications.

Figure 3:
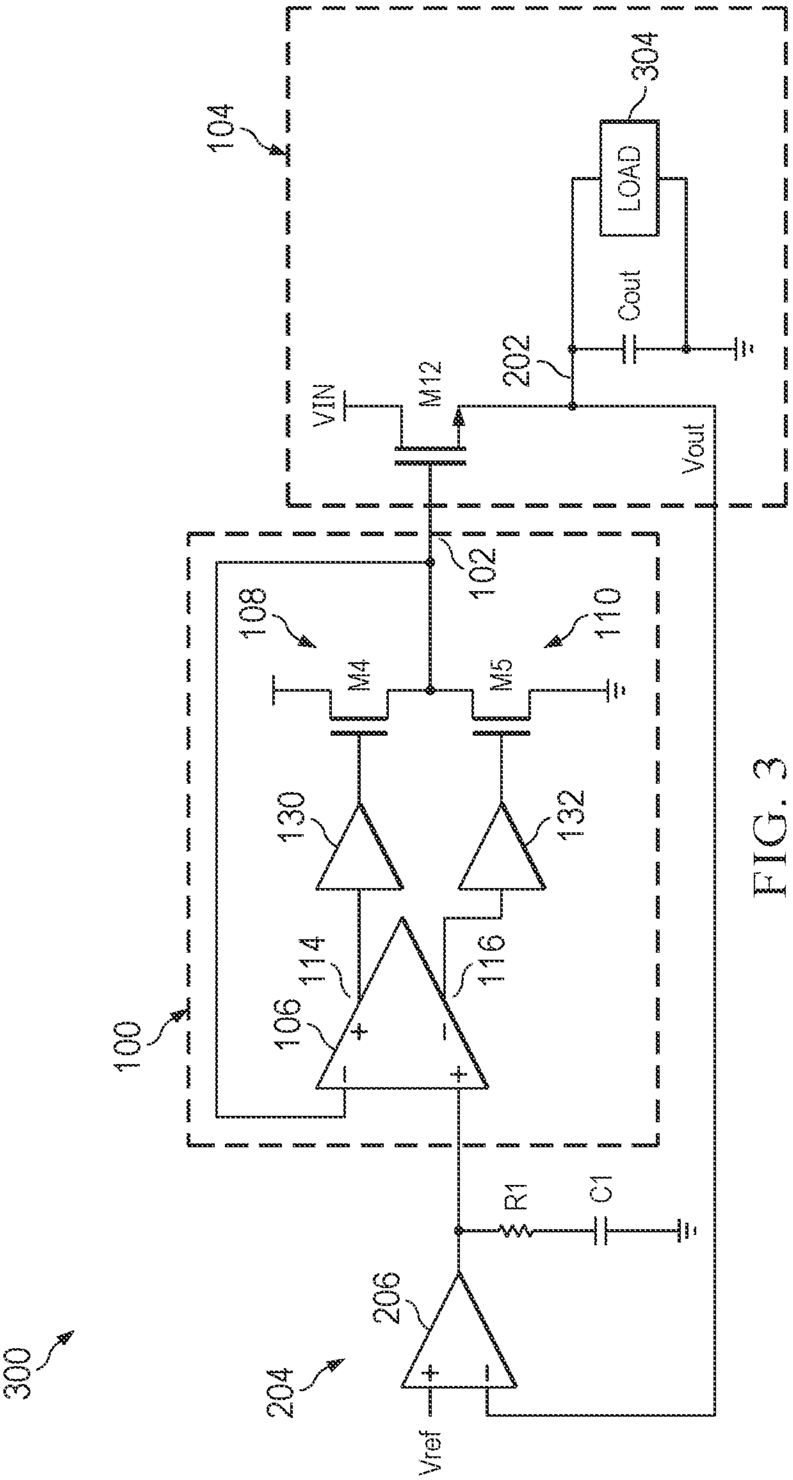
FIG. 3 illustrates an example driver circuit implementation.

FIG. 3 shows a high-level circuit diagram of an example regulator system 300, including a closed loop class AB driver circuit 100, such as described herein. The driver circuit 300 can be implemented according to the example drivers described herein, such as circuits 100 and 200 shown in FIGS. 1 and 2. Accordingly, the description of FIG. 3 also refers to FIGS. 1 and 2. Other configurations of driver circuitry based on this description can also be used in the regulator system 300. The regulator system 300 includes an outer control loop that includes error amplifier 206 having an inverting input coupled to regulator output 202 and a non-inverting input configured to receive reference voltage VREF. A filter, such as including R1 and C1, is coupled to the output of the error amplifier 206 to provide an error signal V_ERROR at the input 112 of the driver circuit 100.

The driver circuit 100 includes a common path input stage 106 and respective output stages 108 and 110. As described herein, the common path input stage 106 is configured to implement a gm-boost to the output stage 108. The gm-boosting enables the driver circuit to react more quickly to increased current demand and reduce undershoot. As a result, the driver circuit 100 is configured to implement a stronger turn on for the LDO power FET M12 or to pull up VDRV at 102. This is in contrast to some existing designs that tend to be configured to implement a stronger turn off of the LDO power FET to reduce overshoot transients.

In an example, the system 300, including the outer loop circuit 204, the driver circuit 100 and the output FET M12 are implemented in a common IC. In another example, the output FET M12 is part of a separate IC external to the IC implementing the driver circuit 100 and outer loop circuit 204.

In the example of FIG. 3, output circuitry 104 includes an output capacitor COUT coupled to the output 202 in parallel with a load 304. The load 304 can be implemented by various electrical circuits. Examples of electrical circuits that can be implemented as the load 304 include voltage-controlled oscillators (VCOs), analog-to-digital converters, DACs, high-end processors, RF amplifiers, SerDes circuits, and FPGAs. Alternatively, in other examples, M12, COUT and the load 304 can be replaced with one or more other loads.

Figure 4:
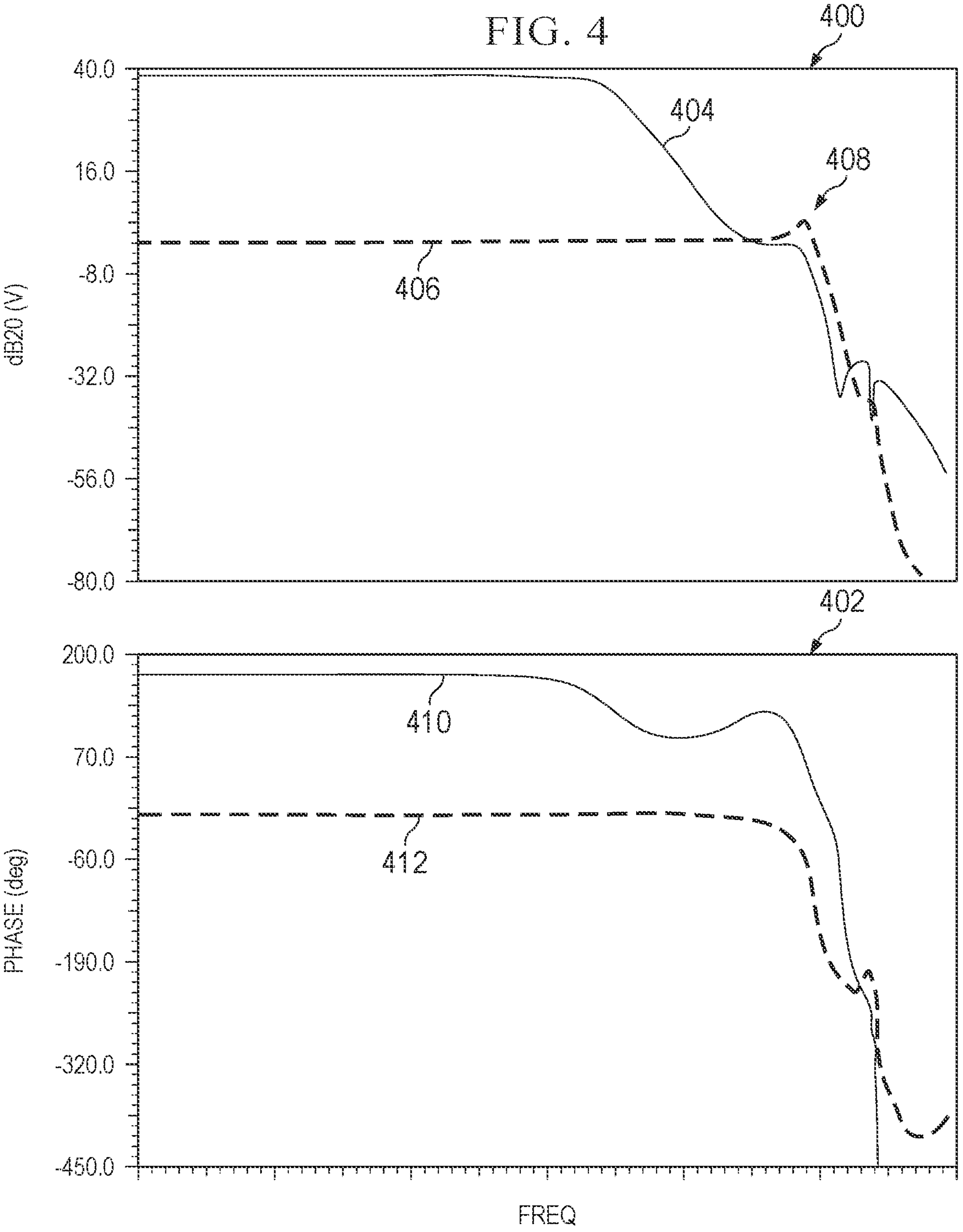
FIG. 4 illustrates a graph showing open and closed loop responses for different example driver circuits.

FIG. 4 depicts graphs 400 and 402 showing open and closed loop gain and phase responses for different example class AB driver circuits at the gate of M4 for the regulator system 200 of FIG. 2. The graph 400 includes an open loop response 404 and a closed loop response 406 for the driver circuit 100 of FIG. 2, in which the filter 208 has been omitted from the system 200. As shown in the graphs 400 and 402, the driver circuit 100 is configured to push an intermediary pole out to well beyond the unity gain bandwidth of the LDO. However, the closed loop response 406 (in the absence of the filter 208) in the graph 400 exhibits some peaking, shown at 408. The peaking occurs just after the unity gain bandwidth of the global control loop for the system 200.

The other graph 402 includes plots 410 and 412 for respective open and closed loop phase responses for the driver circuit 100 in the absence of RC filter 208 shown in FIG. 2. When the driver circuit 100 is configured to include the parallel RC filter 208, the peaking 408 from the response 406 would be removed or dampened. The resulting driver circuit thus can increase stability over a range over expected operating conditions.

Figure 5:
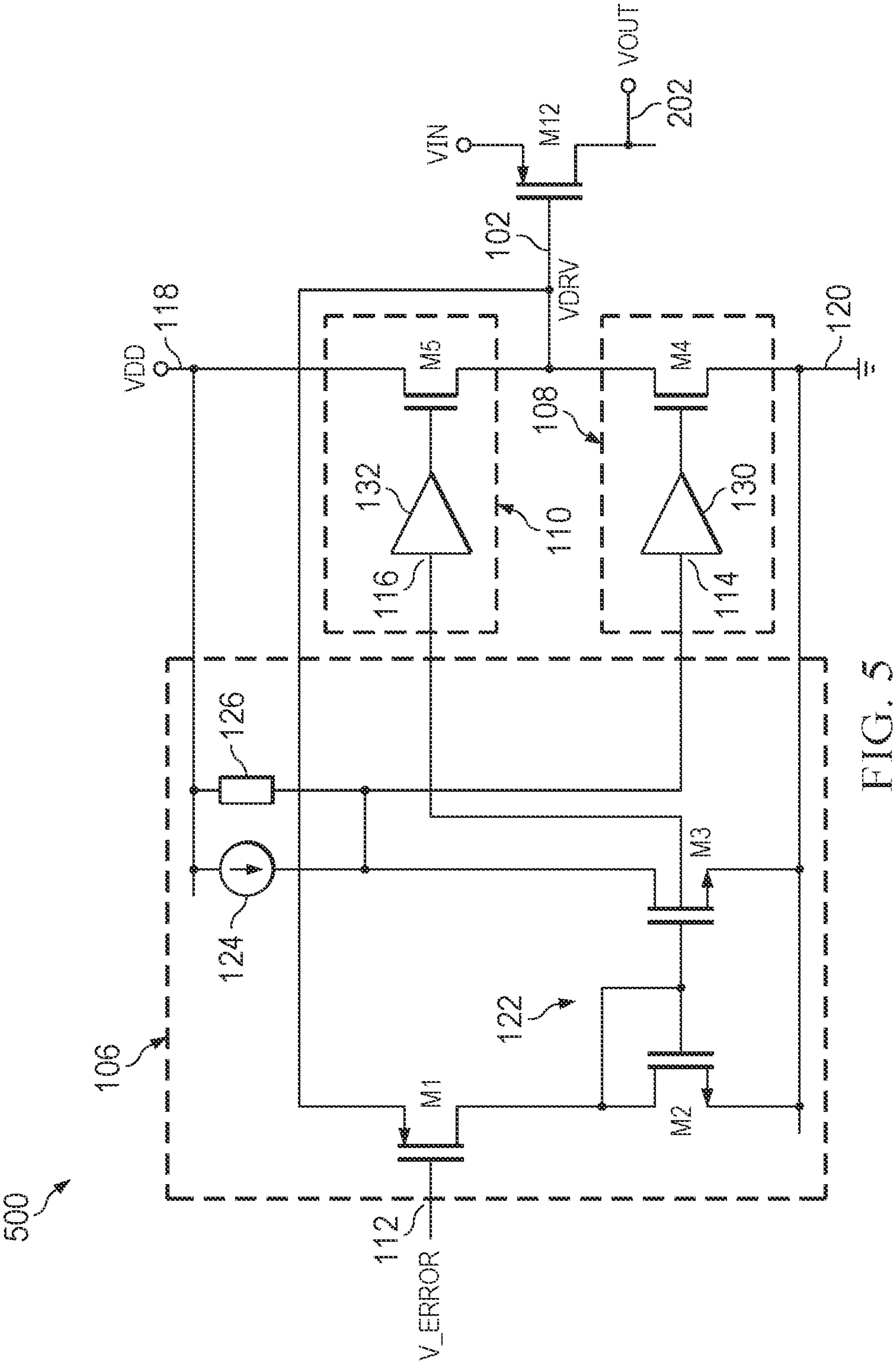
FIG. 5 illustrates another example driver circuit coupled to a load.

As another example, FIG. 5 is an example class AB driver circuit 500 which is shown as a generally inverted version of the circuit 100 of FIG. 1. Accordingly, the description of FIG. 5 also refers to FIG. 1 as appropriate. For example, the driver circuit 500 has output 102 (e.g., a terminal) adapted to be coupled to output circuitry 104, which is shown in FIG. 5 as including a PFET M12 (e.g., an LDO power PFET). As described herein, the driver circuit 100 includes a common path input stage 106, a first output stage 108 and a second output stage 110. The common path input stage 106 has an input 112 and first and second outputs 114 and 116. The input 112 is adapted to receive an error signal V_ERROR, such as representative of a command for increasing or decreasing an output voltage VOUT at an output 202. In the example of FIG. 1, the driver circuit 100 is coupled between first and second voltage terminals 118 and 120, shown as voltages VDD and ground. Other relative voltages can be used in other examples to establish a desired voltage potential between the terminals 118 and 120. The output 202 is coupled to a supply voltage VIN, which can be coupled to terminal 118.

In the example of FIG. 5, the input stage 106 includes a PFET M1 having a gate coupled to (or providing) the common path input 112. The drain of M1 is coupled to a current mirror 122 and the source of M1 is coupled to the driver output 102. The driver circuit 100 is configured to provide a driver output signal VDRV at 102. The current mirror 122 includes transistors M2 and M3, which are shown as NFETs. M2 is diode-connected, in which the source is coupled to terminal 120 and the drain is coupled to the drain of M1. The source of M3 is coupled to terminal 120 and the source is coupled to terminal 118 through a current source 124. The current source 124 is configured to provide a bias current to the drain of M3, such as can be fixed or dynamic bias current. A compensation filter network 126 is coupled in parallel with the current source 124. The drain of M3, which is coupled to the current source 124 and filter network 126, also is coupled to the first output 114 of the input stage 106. The filter network 126 is configured to stabilize the control signal at output 114.

The first output stage 108 includes a buffer 130 and an output transistor M4. An input of the buffer 130 is coupled to the first output 114, and the buffer output is coupled to the gate of M4. M4 is coupled between the voltage terminal 120 and the driver output 102. For example, the input of buffer 130 has a negative polarity. The input stage 106 is configured to supply a gm-boosted control signal at 114 responsive to the error signal V_ERROR having a value representative of a command to decrease (or not change) VOUT. For example, the gain-boosting circuitry, which includes current source 124 and filter network 126, is coupled to the output of the current mirror (the drain of M3 and output 114). As described herein, the gain-boosting circuitry provides a gain described by the gm of M3 times an output impedance at 114 based on combined impedance at the drain of M3, current source 124 and filter network 126. The gain-boosting circuit thus is configured to implement gm-boosting for the first output stage 108. The input stage 106 thus is configured to provide the gm-boosted control signal to the input of output stage 108. In the example of FIG. 1, the buffer 130 is configured to pass the gm-boosted signal from 114 to the gate of M4. M4 turns on responsive to the gm-boosted signal at 114 to couple the driver output 102 to terminal 120 so the driver output 102 is pulled down to turn on PFET M12. The gm-boosted control signal at 114 enables a stronger turn-on for M4 to facilitate turn on (e.g., pull down) of the PFET M12, such as responsive to power demands of a load coupled at 202.

The second output stage 110 includes a buffer 132 and an output transistor M5. An input of the buffer 132 is coupled to the second output 116, which is coupled to the common gates of M2 and M3. The output of the buffer 132 is coupled to the gate of M5, and M5 is coupled between the driver output 102 and the voltage terminal 118. For example, the input of buffer 132 has a positive polarity (e.g., opposite of the polarity at the input of buffer 130). The input stage 106 is configured to supply a respective control signal at a second output 116 responsive to the error signal V_ERROR requesting an increase in VOUT. In the example of FIG. 5, the buffer 132 is configured to pass the second control signal to the gate of M5, which activates M5 to couple the driver output 102 to the terminal 118 and pull-up the driver output 102 as needed.

In view of the foregoing, circuits and systems described herein can implement a driver circuit having lower headroom, higher bandwidth and an improved transient response. The driver circuit can also be configured with a lower output impedance for a given bias current, which enables the driver circuit to achieve higher bandwidth operation than other driver designs.

As a result, circuits and systems implementing a class AB driver circuit, as described herein, can be used to provide lower supply voltages to end equipment loads, which results in power savings. Furthermore, an improved transient response, particularly due to reduced undershoot, can further achieve improved speed, and higher accuracy. The lower bias currents used in the driver circuit (e.g., by current sources 124, 210 and 212) affords power savings and enables smaller charge pump. Collectively, such factors enable the driver circuit to be implemented in smaller size than comparable existing solutions.

In this description, the term "couple" or "couples" means either an indirect or direct connection. Thus, if a first device couples to a second device, that connection may be through a direct connection or through an indirect connection via other devices and connections. For example, if device A generates a signal to control device B to perform an action, then: (a) in a first example, device A is coupled to device B; or (b) in a second example, device A is coupled to device B through intervening component C if intervening component C does not alter the functional relationship between device A and device B, so device B is controlled by device A via the control signal generated by device A.

The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A circuit comprising:

an input stage having a control voltage input, a first control output and a second control output;

a first path stage having a first voltage input and a third output, the first voltage input coupled to the first control output, and the third output coupled to a driver output;

a second path stage having a second voltage input and a fourth output, the second voltage input coupled to the second control output, and the fourth output coupled to the driver output; and a load transistor having a control input and a voltage output, the control input coupled to the driver output, the input stage configured to provide gm-boosting to the first path stage to turn on the load transistor responsive to an output voltage at the voltage output, wherein the input stage includes:

an input transistor having a control terminal coupled to the control voltage input, a first current terminal, and a second current terminal;

a current mirror having a mirror input, a voltage source input and a mirror output, the mirror input coupled to the first current terminal of the input transistor and the second voltage input, the voltage source input coupled to a first voltage terminal, and the mirror output coupled to the first voltage input;

a current source coupled between the mirror output and a second voltage terminal; and a filter network coupled in parallel with the current source between the mirror output and the second voltage terminal.

2. The circuit of claim 1, wherein the input stage further comprises:

the input transistor having a gate, a source and a drain, in which the gate is coupled to the control voltage input.

3. The circuit of claim 1, wherein the first path stage comprises:

a buffer having a buffer input and a buffer output, the buffer input coupled to the first control output; and a first-path output transistor having a first control terminal, a second terminal and a third terminal, the first control terminal coupled to the buffer output, the second terminal coupled to the first voltage terminal and the third terminal coupled to the driver output.

4. The circuit of claim 3, wherein an impedance at the first control output is configured to implement the gm-boosting for the first path stage.

5. The circuit of claim 3, wherein the buffer is a first buffer, the second path stage comprising:

a second buffer having a second buffer input and a second buffer output, the second buffer input coupled to the second control output; and a second-path output transistor having a second control terminal, a fourth terminal and a fifth terminal, the second control terminal coupled to the second buffer output, the fourth terminal coupled to the second voltage terminal and the fifth terminal coupled to the driver output.

6. The circuit of claim 5, wherein each of the first-path and second-path output transistors and the load transistor are the same type of transistors.

7. The circuit of claim 6, wherein each of the first-path output transistor, the second-path output transistor and the load transistor is implemented using a respective n-type of transistor or each of the first-path output transistor, the second-path output transistor and the load transistor is implemented using a respective p-type of transistor.

8. The circuit of claim 7, wherein the filter network is a first filter network, and the input stage comprises a second filter network coupled between the second current terminal of the input transistor and the driver output.

9. The circuit of claim 1, further comprising an error amplifier having a reference input, a feedback voltage input and an error output, the feedback voltage input coupled to the voltage output, and the error output coupled to the control voltage input of the input stage.

10. The circuit of claim 9, wherein the error amplifier is configured to provide an error signal to the control voltage input responsive to the voltage output and a reference voltage received at the reference input.

11. A circuit comprising:

a common path input stage configured to provide a first gm-boosted control signal at a first output responsive to an error signal requesting turn on of a load transistor and a second control signal at a second output responsive to the error signal requesting turn off of the load transistor, wherein the common path input stage includes:

an input transistor configured to conduct a current from a first voltage terminal responsive to the error signal;

a current mirror configured to mirror the current from the input transistor and provide a mirrored current to the first output; and a first filter network coupled in series between the input transistor and the load transistor:

a first path stage configured to provide a first voltage to a driver output responsive to the first gm-boosted control signal;

a second path stage configured to provide a second voltage to the driver output responsive to the second control signal; and the load transistor configured to regulate an output voltage responsive to the voltage at the driver output by turning on responsive to the first voltage and turning off responsive to the second voltage.

12. The circuit of claim 11, wherein the first path stage comprises a first buffer and a first transistor, in which the first buffer is configured to buffer the first gm-boosted control signal to control the first transistor to turn on the load transistor; and the second path stage comprises a second buffer and a second transistor, in which the second buffer is configured to buffer the second control signal to control the second transistor to turn off the load transistor.

13. The circuit of claim 12, wherein each of the first transistor, the second transistor and the load transistor is implemented using a respective same type of transistor.

14. The circuit of claim 13, wherein each of the first transistor, the second transistor and the load transistor is implemented using a respective n-channel field effect transistor or a respective p-channel field effect transistor.

15. The circuit of claim 12, wherein the common path input stage further comprises:

gain-boosting circuitry coupled to the first output, the gain-boosting circuitry configured to implement gm-boosting for the first path stage responsive to an impedance at the first output and the mirrored current.

16. The circuit of claim 15, wherein the gain-boosting circuitry comprises:

a second filter network configured to stabilize a voltage at an input of the first path stage; and a current source coupled in parallel with the second filter network between the first output and a second voltage terminal, wherein the current source and the second filter network are configured to provide the impedance at the first output to implement the gm-boosting.

17. The circuit of claim 16, wherein the first filter network is configured to reduce peaking in a closed loop response of the circuit.

18. The circuit of claim 16, wherein the current source is configured to provide a fixed or variable current.

19. The circuit of claim 12, wherein the second path stage is configured to turn off the load transistor to within a saturation voltage of ground or a supply voltage.

20. The circuit of claim 11, further comprising an error amplifier configured to provide the error signal responsive to the output voltage and a reference voltage.

21. A system comprising:

an error amplifier having a reference input, a feedback voltage input and an error output;

a class AB driver comprising:

a common path stage having an error input, a feedback input, a first gain-boosted output, an input transistor including a current terminal, a current mirror, and a second output, the error input coupled to the error output, wherein the current mirror includes:

a first transistor including a first current terminal and a control terminal coupled to the current terminal of the input transistor, and a second current terminal; and a second transistor including a first current terminal coupled to first gain-boosted output, a control terminal coupled to the control terminal of the first transistor, and a second current terminal coupled to the second current terminal of the first transistor;

a pull-up path circuit comprising:

a first buffer having a first buffer input and a first buffer output, the first buffer input coupled to the first gain-boosted output, and a pull-up transistor having a first control input and a third output, the first control input coupled to the first buffer output, and the third output coupled to a driver output; and a pull-down path circuit comprising:

a second buffer having a second voltage input and a second buffer output, the second voltage input coupled to the second output; and a pull-down transistor having a second control input and a fourth output, the second control input coupled to the second buffer output, and the fourth output coupled to the driver output; and a capacitive load having an input and a feedback output, in which the input is coupled to the driver output and the feedback output is coupled to the feedback voltage input, the feedback output configured to provide a signal representative of an output voltage.

22. The system of claim 21, wherein the capacitive load comprises a load transistor, the common path stage is configured to provide a gm-boost for a circuit path to the driver output that turns on the load transistor; and the common path stage is configured to control the pull-down path circuit to pull down the driver output to within a saturation voltage of ground or a supply voltage.

23. The system of claim 22, wherein each of the pull-up transistor, the pull-down transistor and the load transistor is implemented using a respective same type of transistor.

* * * * *